(12) United States Patent
Ma et al.

(10) Patent No.: US 12,638,954 B2
(45) Date of Patent: May 26, 2026

(54) ASSISTING USER(S) IN INTERACTIONS WITH LARGE LANGUAGE MODEL(S)

(71) Applicant: GOOGLE LLC, Mountain View, CA (US)

(72) Inventors: Xiao Ma, Seattle, WA (US); Ariel Liu, Mountain View, CA (US); Quoc Le, Sunnyvale, CA (US); Jilin Chen, Cupertino, CA (US); Heng-Tze Cheng, Mountain View, CA (US); Swaroop Mishra, Mountain View, CA (US); Sophie Ying Su, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 191 days.

(21) Appl. No.: 18/416,679

(22) Filed: Jan. 18, 2024

(65) Prior Publication Data

US 2025/0173043 A1 May 29, 2025

Related U.S. Application Data

(60) Provisional application No. 63/603,438, filed on Nov. 28, 2023.

(51) Int. Cl.
G06F 3/0482 (2013.01)
G06F 40/40 (2020.01)
G06T 11/00 (2006.01)

(52) U.S. Cl.
CPC ............ G06F 3/0482 (2013.01); G06F 40/40 (2020.01); G06T 11/00 (2013.01); G06T 2200/24 (2013.01)

(58) Field of Classification Search
CPC ................................................ G06F 3/048–05
See application file for complete search history.

(56) References Cited

U.S. PATENT DOCUMENTS 8,601,019 B1 * 12/2013 Weininger ........ G06F 16/90324
707/769
8,645,825 B1 * 2/2014 Cornea ................. G06F 40/232
715/257

(Continued)

OTHER PUBLICATIONS

Cai, T. et al., "Large Language Models as Tool Makers"; arXiv.org; preprint arXiv:2305.17126v1; 22 pages; dated May 26, 2023.

(Continued)

*Primary Examiner* — Daniel Rodriguez
(74) *Attorney, Agent, or Firm* — Gray Ice Higdon

(57) ABSTRACT

Implementations relate to a method implemented by one or more processors, the method including: receiving an input prompt for a large language model (LLM); generating first LLM output that is usable to generate a set of user interface (UI) each associated with a corresponding sub-prompt of the input prompt; causing, based on the first LLM output, the set of UI elements to be rendered at a user device; receiving further user input based on user interactions with one or more of the UI elements of the set of UI elements; and in response to determining that one or more termination conditions are satisfied: generating a final response to the input prompt based on generating second LLM output that is usable to generate the final response; and causing the final response to be rendered at the user device.

20 Claims, 8 Drawing Sheets

(56) References Cited

U.S. PATENT DOCUMENTS

| | | | | |
|---|---|---|---|---|
| 11,875,020 | B1 * | 1/2024 | Jetmundsen | G06F 3/0483 |
| 2010/0241996 | A1 * | 9/2010 | Ho | G06F 3/0482 |
| | | | | 715/841 |
| 2021/0042662 | A1 * | 2/2021 | Pu | G06Q 50/01 |
| 2023/0237053 | A1 * | 7/2023 | Dangoor | G06F 16/3322 |
| | | | | 707/767 |
| 2023/0316001 | A1 * | 10/2023 | Araki | G06F 40/295 |
| 2024/0303422 | A1 * | 9/2024 | Fabian | G06F 16/3329 |
| 2024/0362422 | A1 * | 10/2024 | Callegari | G06F 9/543 |
| 2024/0403112 | A1 * | 12/2024 | Mohammed | G06Q 10/06311 |
| 2024/0404170 | A1 * | 12/2024 | Wong | G06T 19/20 |
| 2025/0077765 | A1 * | 3/2025 | Xu | G06F 40/56 |
| 2025/0086011 | A1 * | 3/2025 | Pack, III | G06F 9/5066 |
| 2025/0117698 | A1 * | 4/2025 | Joynt | G06N 20/00 |
| 2025/0156651 | A1 * | 5/2025 | Zhuo | G06F 16/954 |
| 2025/0165697 | A1 * | 5/2025 | Saleh | G06F 40/166 |

OTHER PUBLICATIONS

Chang, M. et al., "The Prompt Artists"; in Proceedings of the 15th Conference on Creativity and Cognition; pp. 75-87; dated Jun. 2023.

Chen, W. et al., "Program of Thoughts Prompting: Disentangling Computation from Reasoning for Numerical Reasoning Tasks"; arXiv preprint arXiv:2211.12588; 12 pages; dated 2022.

Corbett-Davies, S. et al., "Algorithmic Decision Making and the Cost of Fairness"; In Proceedings of the 23rd ACM SIGKDD International Conference on Knowledge Discovery and Data Mining; pp. 797-806; dated 2017.

Eslami, M. et al., "'I always assumed that I wasn't really that close to [her]': Reasoning about Invisible Algorithms in News Feeds"; In Proceedings of the 33rd annual ACM Conference on Human Factors in Computing Systems; pp. 153-162; dated 2015.

Fisher, K. et al., "Distributed Sensemaking: Improving Sensemaking by Leveraging the Efforts of Previous Users"; In Proceedings of the SIGCHI Conference on Human Factors in Computing Systems; 10 pages; dated May 2012.

Hendrix, G.G. "Natural-Language Interface"; American Journal of Computational Linguistics vol. 8, No. 2; pp. 56-61; dated 1982.

Hollan, J. et al., "Distributed Cognition: Toward a New Foundation for Human-Computer Interaction Research"; ACM Transactions on Computer-Human Interaction (TOCHI) vol. 7, No. 2; pp. 174-196; dated Jun. 2000.

Jansen, B.J. "The Graphical User Interface"; ACM SIGCHI Bulletin vol. 30, No. 2; pp. 22-26; dated Apr. 1998.

Jiang, P. et al., "Graphologue: Exploring Large Language Model Responses with Interactive Diagrams"; arXiv preprint Cornell University; arXiv:2305.11473; 19 pages; dated 2023.

Khot, T. et al., "Decomposed Prompting: A Modular Approach for Solving Complex Tasks"; arXiv preprint arXiv:2210.02406v1; 36 pages; dated Oct. 5, 2022.

Kim, Y. et al., "Understanding Users' Dissatisfaction with ChatGPT Responses: Types, Resolving Tactics, and the Effect of Knowledge Level"; arXiv preprint arXiv:2311.07434v1; 19 pages; dated Nov. 13, 2023.

Kirsh, D. "Complementary Strategies: Why we use our hands when we think"; Proceedings of the 17th Annual Conference of the Cognitive Science Society; 7 pages; dated 1995.

Klemmer, S.R. et al., "How Bodies Matter: Five Themes for Interaction Design"; In Proceedings of the 6th Conference on Designing Interactive Systems; pp. 140-149; dated 2006.

Lahoti, P. et al., "Improving Diversity of Demographic Representation in Large Language Models via Collective-Critiques and Self-Voting"; arXiv preprint arXiv:2310.16523v1; 23 pages; dated Oct. 25, 2023.

Liu, M.X. et al., "Unakite: Scaffolding Developers' Decision-Making Using the Web"; In Proceedings of the 32nd Annual ACM Symposium on User Interface Software and Technology; pp. 67-80; dated Oct. 2019.

Ma'Ayan, D. et al., "How Domain Experts Create Conceptual Diagrams and Implications for Tool Design"; In Proceedings of the 2020 CHI Conference on Human Factors in Computing Systems; pp. 1-14; dated Apr. 2020.

Maglio, P.P. et al., "Interactive Skill in Scrabble"; In Proceedings of the 21st Annual Conference of the Cognitive Science Society; Psychology Press; 5 pages; dated 2020.

Mishra, S. et al., "Reframing Instructional Prompts to GPTk's Language"; In Findings of the Association for Computational Linguistics: ACL 2022; pp. 589-612; dated May 2022.

Mishra, S. et al., "Cross-Task Generalization via Natural Language Crowdsourcing Instructions"; In Proceedings of the 60th Annual Meeting of the Association for Computational Linguistics (vol. 1: Long Papers); pp. 3470-3487; dated May 2022.

Mishra, S. et al., Help Me Think: A Simple Prompting Strategy for Non-experts to Create Customized Content with Models. In Findings of the Association for Computational Linguistics; pp. 11834-11890; dated Jul. 2023.

Nye, M. et al., "Show Your Work: Scratchpads for Intermediate Computation with Language Models"; In Deep Learning for Code Workshop; 16 pages; dated 2022.

Oard, D.W. et al." Implicit Feedback for Recommender Systems"; AAAI Workshop on Recommender System; 3 pages; dated 1998.

OpenAI; "GPT-4 Technical Report"; arXiv.org, Cornell University, arXiv:2303.08774; 100 pages; dated Mar. 2023.

Ouyang, L. et al., "Training language models to follow instructions with human feedback"; Advances in Neural Information Processing Systems 35; 15 pages; dated 2022.

Patel, P. et al., "Is a Question Decomposition Unit all we Need?"; In Proceedings of the 2022 Conference on Empirical Methods in Natural Language Processing; pp. 4553-4569; dated Dec. 2022.

Schick, T. et al., "Toolformer: Language Models Can Teach Themselves to Use Tools"; arXiv preprint arXiv:2302.04761v1; 17 pages; dated Feb. 9, 2023.

Suh, S. et al. "Sensecape: Enabling Multilevel Exploration and Sensemaking with Large Language Models"; arXiv preprint arXiv:2305.11483; 17 pages; dated May 2023.

Suwa, M. et al., "Seeing Into Sketches: Regrouping Parts Encourages New Interpretations"; In Visual and Spatial Reasoning in Design II; pp. 207-219; dated 2001.

Wei, J. et al., "Finetuned Language Models are Zero-Shot Learners"; In International Conference on Learning Representations; 46 pages; dated 2022.

Wei, J. et al., "Chain-of-Thought Prompting Elicits Reasoning in Large Language Models"; Advances in Neural Information Processing Systems; 14 pages; dated 2022.

Yao, S. et al., "Tree of Thoughts: Deliberate Problem Solving with Large Language Models"; arXiv preprint arXiv:2305.10601; 11 pages; dated May 17, 2023.

Zamfirescu-Pereira, J.D. et al., "Why Johnny Can't Prompt: How Non-AI Experts Try (and Fail) to Design LLM Prompts"; In Proceedings of the 2023 CHI Conference on Human Factors in Computing Systems; pp. 1-21; Apr. 2023.

Zheng, H.S. et al., "Take a Step Back: Evoking Reasoning via Abstraction in Large Language Models"; arXiv preprint arXiv:2310.06117; 36 pages; dated Oct. 9, 2023.

Zhou, D. et al., "Least-to-Most Prompting Enables Complex Reasoning in Large Language Models"; arXiv.org, Cornell University; arXiv:2205.10625; 63 pages; dated Oct. 2022.

Zubatiy, T. et al., "I don't know how to help with that—Learning from Limitations of Modern Conversational Agent Systems in Caregiving Networks"; Proceedings of the ACM on Human-Computer Interaction, vol. 7, CSCW2; 28 pages; dated Oct. 2023.

Daull, X. et al., "Complex QA & language models hybrid architectures, Survey"; arXiv.org, Cornell University; arXiv:2302.09051; 47 pages; dated Apr. 7, 2023.

Wang, Z. et al., "Interactive Natural Language Processing"; arXiv.org, Cornell University; arXiv:2305.13246; 110 pages; dated May 22, 2023.

Petridis, S. et al., "PromptInfuser: Bringing User Interface Mockups to Life with Large Language Models"; Proceedings of the 2023 CHI Conference on Human Factors in Computing Systems; 6 pages; dated Apr. 19, 2023.

(56) References Cited

OTHER PUBLICATIONS

European Patent Office; International Search Report and Written Opinion issued in Application No. PCT/US2024/051247; 12 pages; dated Jan. 27, 2025.
European Patent Office; Intention to Grant issued in Application No. 24799400.7, 56 pages, dated Feb. 16, 2026.

* cited by examiner

400B

402

I want to plan a trip to Tokyo

404A'

Plan daily itineraries involving art galleries and ramen shops

404B

Identify key dates and duration for the Tokyo trip

404C

Look into flight options and prices to Tokyo

404D

Identify necessary documents for travel to Japan

408

I like art and ramen

410

Re-generate ideas

406

Summarize

500

600

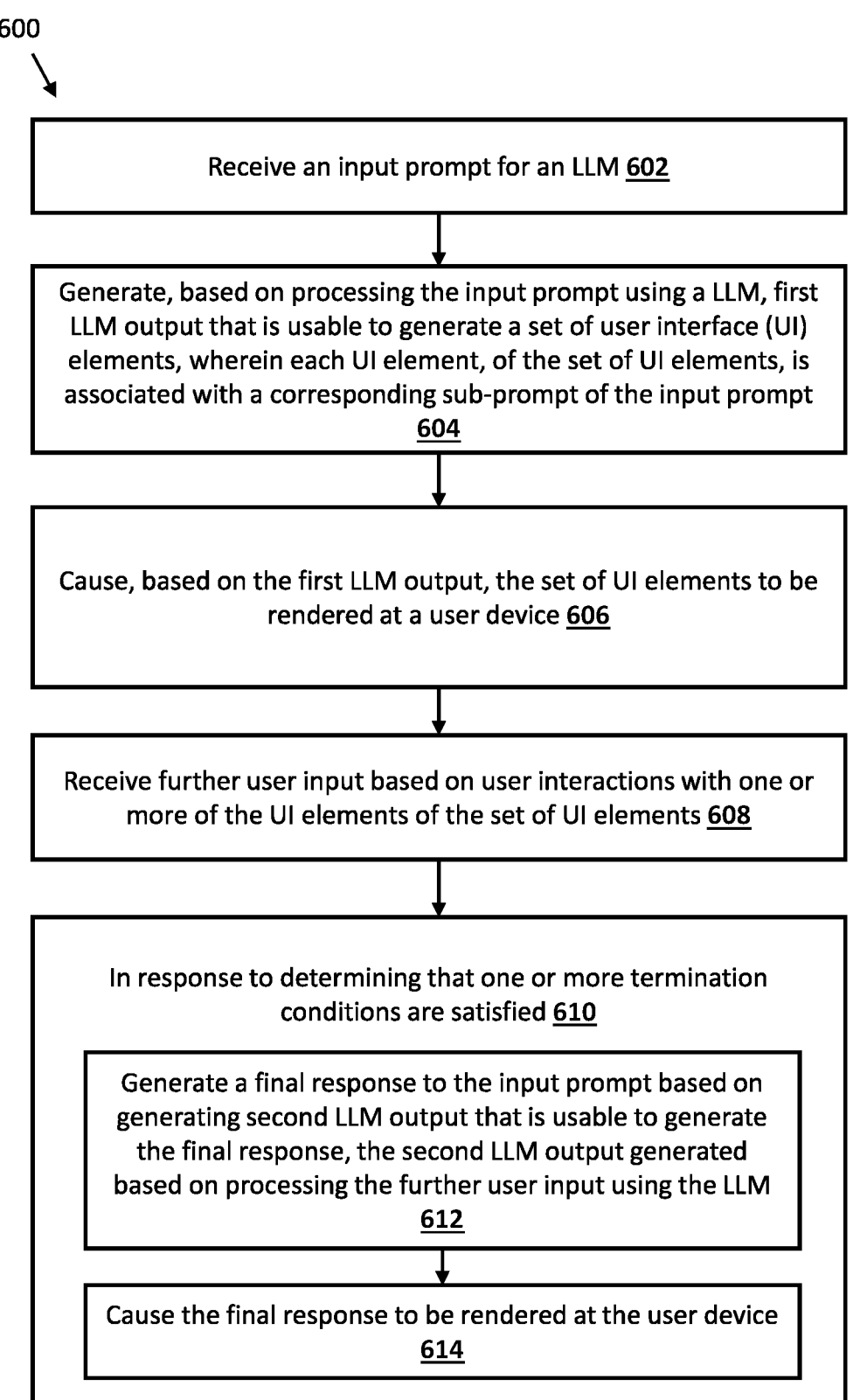

Receive an input prompt for an LLM 602

Generate, based on processing the input prompt using a LLM, first LLM output that is usable to generate a set of user interface (UI) elements, wherein each UI element, of the set of UI elements, is associated with a corresponding sub-prompt of the input prompt 604

Cause, based on the first LLM output, the set of UI elements to be rendered at a user device 606

Receive further user input based on user interactions with one or more of the UI elements of the set of UI elements 608

In response to determining that one or more termination conditions are satisfied 610

Generate a final response to the input prompt based on generating second LLM output that is usable to generate the final response, the second LLM output generated based on processing the further user input using the LLM 612

Cause the final response to be rendered at the user device 614

FIG. 6

ASSISTING USER(S) IN INTERACTIONS WITH LARGE LANGUAGE MODEL(S)

BACKGROUND

Various generative models have been proposed that can be used to process natural language (NL) content and/or other input(s), to generate output that reflects generative content that is responsive to the input(s). For example, large language model(s) (LLM(s)) have been developed that can be used to process NL content and/or other input(s), and to generate LLM output that reflects NL content and/or other content that is responsive to the input(s). For instance, an LLM can be used to process NL content of "how to change DNS settings on Acme router", to generate LLM output that reflects several responsive NL sentences such as: "First, type the router's IP address in a browser, the default IP address is 192.168.1.1. Then enter username and password, the defaults are admin and admin. Finally, select the advanced settings tab and find the DNS settings section". However, current utilizations of generative models suffer from one or more drawbacks.

As one example, LLMs can be utilized as part of a text-based dialogue application, generating responses to textual inputs/queries provided by a user of the application. However, complex input prompts, for example prompts that contain multiple subtasks or refer to several entities, can be difficult for the LLM to handle effectively.

SUMMARY

Implementations disclosed herein are directed to assisting users in interacting with large language model(s) (LLM(s)). By integrating user interfaces (UIs) (such as graphical user interfaces (GUIs)) with the ability to interact with LLM(s) using natural language prompts as described herein, the flexibility of natural language can be leveraged, while maximizing the structure and ease of use of UIs.

For instance, according to implementations disclosed herein, an input prompt, for example derived from a user query, can be received. The input prompt can be considered to represent a node in a tree-like hierarchical structure, where each node is a unit of interaction. The input prompt can be decomposed into a set of sub-prompts (e.g., using an LLM). The sub-prompts can be determined based on the input prompt explicitly including a plurality of discrete integers mapping on to a plurality of sub-prompts and/or the sub-prompts can be inferred based on the input prompt. Each sub-prompt can be considered to represent a child node of the input prompt. In some implementations, the number of nodes and/or layers of nodes can be limited (for instance, the number of layers may be limited to one layer, so that the hierarchical structure includes the root input prompt with one layer of leaf nodes corresponding to sub-prompts of the input prompt). In some implementations, if any limit has not been reached, it can be determined that a sub-prompt be decomposed into further sub-prompts based on, for instance, a request from a user, output from a classifier trained to determine whether an input prompt is of a threshold complexity, etc.

In some implementations, the input prompt can be associated with a particular task to be performed. Furthermore, each of the sub-prompts can be associated with sub-tasks which can be performed in furtherance of performance of the task. As an example, the input prompt can be indicative of a request for a smart home ecosystem to be configured. The sub-tasks can then be determined, for instance, determining which rooms are present in the smart home, determining which devices are to be included in the smart home ecosystem, determining what routines the user wishes to configure, etc.

Once the set of sub-prompts have been determined, a corresponding set of UI elements can be generated and rendered at a user device. For instance, the sub-prompts can be represented by graphical cards rendered on a display of the user device. The UI elements corresponding to the sub-prompts can be interactable by the user. For instance, the UI elements corresponding to the sub-prompts can be selectable (e.g., using touch input, speech input, pointing device input, etc.) by the user. In response to user interaction with the UI elements corresponding to the sub-prompts, information regarding the sub-prompts, and therefore also the original input prompt, can be determined, as described in more detail herein. As such, once one or more termination conditions are satisfied, a final response to the \prompt can be determined (e.g., using the LLM), using this information.

In some implementations, upon interaction (e.g., selection) of a particular UI element, one or more interactive elements can be rendered at the user device. For instance, a GUI rendered on a display of a user device can be updated to include the interactive elements. The interactive elements can represent options responsive to the sub-prompt associated with the particular UI element. For instance, following the example above, in response to the sub-prompt of "determine which rooms are present in the smart home" the user can be presented with the options of "living room", "bedroom", "kitchen", etc. The interactive elements can include checkboxes for the user to check or uncheck to indicate their response. Additionally, or alternatively, the interactive elements can include an entry field for natural language text from the user. Whilst a number of examples have been provided, it should be understood that the interactive elements are not limited to any particular form, and may additionally or alternatively include, for instance, maps, tables, clocks, calendars, etc. In addition, although implementations described herein are generally described in relation to a GUI, it will be appreciated that any suitable user interface can be used (e.g., a voice user interface (VUI)).

In some implementations, the interactive elements can be generated at the same time as generating the set of sub-prompts (e.g., in the same call to the LLM). In some implementations, the interactive elements can be generated subsequent to the interactive elements (e.g., in a subsequent call to the LLM). For instance, the interactive elements can be generated (e.g., using the LLM) in response to the user interacting with (e.g., selecting) the corresponding UI element, or prior to the user interaction.

Additionally, or alternatively, in some implementations, the interactive elements (or the UI elements) can correspond to a tool or external application. For instance, the interactive elements (or the UI elements) can be configured such that, on selection, an external API can be called to provide an appropriate response. This may be the case for, as an example, relatively specific queries which are suitable for autonomous tool use. For instance, assuming an initial query of "Help me pack for a trip to London", a sub-prompt can be determined as "Check what season is it currently in London", which can be objectively and factually determined using an API call to an external application (e.g., an internet search application). In this way, factually inaccurate responses (sometimes referred to in this context as hallucination), can be reduced.

In some implementations, the receipt of additional input (also referred to herein as additional data or additional information) from the user can be facilitated (e.g., in addition to interaction with the UI elements associated with the sub-prompts). For instance, the additional input can include NL based input provided via a natural language text entry field rendered on a display of the user's device (e.g., using a virtual keyboard, a speech input, etc.). The additional input can include additional information to be taken into account when responding to the initial input prompt. For instance, the additional information can be considered when generating the final response (e.g., using the LLM), when generating or updating the sub-prompts and corresponding UI elements, and/or when generating or updating the interactive elements corresponding to the sub-prompts. The additional input can include, for instance, additional context the user wishes to add, or user preferences. As an illustrative example, assuming the initial input prompt is indicative of a task to be performed by a robot, the additional input can, for instance, relate to one or more parameters or constraints of the task (e.g., a time for the task to be completed, a particular robot to be used, a particular target object to be interacted with by the robot, a particular route for the robot to use when performing the task, etc.) which may not be represented in the UI elements corresponding to the sub-prompts. For instance, assuming the task is a request for the robot to retrieve a beverage from a kitchen, the additional information might include, for instance, the text "I would like a cold beverage". Responsively, when the final response is generated, based on this additional information, it can be determined to retrieve a beverage from a refrigerator in the kitchen. If, subsequently, the user provided more additional information including the text, "The children are playing in the living room", when the final response is generated, based on this additional information, it can also be determined that the robot should follow a path avoiding the living room. Additionally, or alternatively, the UI elements corresponding to the sub-prompts and/or the interactive elements associated with the UI elements (e.g., rendered responsive to selection of the UI elements) can be updated (e.g., using the LLM) based on this additional information. For instance, in response to the additional information "I would like a cold beverage", a UI element including the text "determine which shelf of the refrigerator the beverage is located" can be rendered, and/or an interactive element including the text "the second shelf on the left" can be rendered. Although the additional input is generally described as being received from a user, it should be understood that the additional input can be retrieved from other sources. For instance, the additional input can be retrieved from other applications with which the user has granted permission to share contextual information (e.g., such as calendar entries, weather forecast information, messaging content, etc.).

In some implementations, the one or more termination conditions for determining when the final response should be determined (e.g., using the LLM) can include an explicit indication from a user that the final response should be provided. For instance, the user can provide user input (e.g., via selection of a corresponding GUI element, via speech input, etc.) indicative of a request to provide a final response has been received.

Additionally, or alternatively, the one or more termination conditions can include implicit indication(s). For instance, the one or more termination conditions can be satisfied when a response has been determined for at least a threshold number (or e.g., a threshold proportion) of the sub-prompts (e.g., via user interaction with the UI elements and/or the interactive elements thereof). As another example, the one or more termination conditions can be satisfied when it is determined that sufficient information has been provided (e.g., via interaction with the UI elements, the interactive elements thereof and/or any additional information provided by the user) to generate a response to the initial input prompt. This can be determined, for instance, by the LLM, or by another model for determining whether a final response should be provided.

Some implementations described herein include one or more LLMs being used to generate a set of sub-prompts, one or more options responsive to the sub-prompts, and a final response to the initial input prompt. The set of sub-prompts (or UI elements corresponding thereto) can be generated based on LLM output (also referred to herein as first LLM output) generated based on processing, using the LLM, the initial input prompt as well as any relevant additional data (e.g., as input by a user to update a current version of the UI elements rendered to the user). In some implementations, the one or more options responsive to the sub-prompt can be generated at the same time as the sub-prompts, in a single call to the LLM (e.g., based on the first LLM output). In some implementations, the one or more options responsive to a particular sub-prompt can be generated based on LLM output (also referred to herein as third LLM output) generated based on processing, using the LLM, the particular sub-prompt (or the portion of the first LLM output corresponding to the particular sub-prompt), as well as optionally any additional information provided by the user. The final response can be generated based on LLM output (also referred to herein as second LLM output) generated based on processing, using the LLM, user interaction information (e.g., the initial query provided by the user, user interaction with the UI elements corresponding to the set of sub-prompts, user interaction with the options corresponding to the sub-prompts, any additional information provided by the user, and/or any other relevant information retrieved from other sources).

In some implementations, respective LLM input for the LLM output can be generated (e.g., a first LLM input can be generated and subsequently utilized in generating the first LLM output, a second LLM input can be generated and subsequently utilized in generating the second LLM output, a third LLM input can be generated and subsequently utilized in generating the third LLM output). For instance, the first LLM input can be generated to include a request to decompose the input prompt into corresponding sub-prompts (in addition to the initial input prompt as well as any relevant additional data). The second LLM input can be generated to include a request to summarize the user interaction to provide a final response (in addition to the user interaction information). The third LLM input can be generated to include a request to provide one or more candidate responses (or options) to a corresponding sub-prompt (in addition to the sub-prompt as well as optionally any additional information provided by the user). In some implementations, the LLM input(s) can be tailored according to the input prompt and/or other contextual information such as the task to be completed (e.g., in terms of the number of sub-prompts, the types of options for responding to the sub-prompts, etc.). In some implementations, the first, second, and/or third LLM inputs can be formatted according to respective templates that are not provided by the user that provided the initial input prompt and can be provided to the LLM(s) even without the user's knowledge. The template can include, for example, a space or entry field after each of the requests to prompt the LLM to fill the space or entry field with output that is responsive to the respective requests.

A non-limiting example of a template which could be used to generate a first LLM input is provided below:

Example Template 1

I want to accomplish the main goal of: <initial query>
Consider the following: <additional input>
To better assist me, please break down the main goal into step-by-step prompts.
Each prompt should solve a sub-problem that helps me to solve the main goal.
Make it so that each sub-prompt is directly executable and can produce useful results.
Make sure each sub-prompt is concise and less than 15 words.
Output Format:
{
    "sub-problems": A list of strings (max 10), each as a valid sub-prompt
}
Output:

As illustrated in this example, the request to decompose the input prompt (or in other words, the initial query) can include one or more high level requests to guide the LLM to provide appropriate responses. For instance, in the case of Example template 1, a high level request can include the text "To better assist me, please break down the main goal into step-by-step prompts", "Each prompt should solve a sub-problem that helps me to solve the main goal", "Make it so that each sub-prompt is directly executable and can produce useful results", and/or "Make sure each sub-prompt is concise and less than 15 words". In addition, it can be assumed that the LLM input be generated such that the input prompt (which might be, for instance, a natural language (NL) based input) is provided as the argument for "<initial query>" in the LLM input. In some implementations, as illustrated in this example, the LLM input can include a request for any additional input from the user (or retrieved from other sources) to be taken into account when generating the sub-prompts. As such, in this example, it can be assumed that the LLM input be generated such that the additional input is provided as the argument for <additional input>. The output of the LLM can be, for instance, usable to generate a set of UI elements (e.g., GUI cards) corresponding to the sub-prompts.

A non-limiting example of a template which could be used to generate a third LLM input is provided below:

Example Template 2

I want you to answer: <initial query>
Consider the following: <additional input>
Here is a sub-prompt to help answer the main goal, generated by a helpful system: <sub-prompt>
Go into details to help me with the sub-prompt.
Show me some options to personalize and choose from.
Be concrete and make sure the options are valid choices to finish the task in the sub-prompt.
Display each option in the format of:
{
    "recommended": Your recommendation.
    "options": A list of options for me to choose from. Each option is a single string.
}
Output:

As illustrated in this example, the request to provide options for a given sub-prompt can include one or more high level requests to guide the LLM to provide appropriate responses. For instance, in the case of Example template 2, a high-level request can include the text "Go into details to help me with the sub-prompt", "Show me some options to personalize and choose from", and/or "Be concrete and make sure the options are valid choices to finish the task in the sub-prompt". In addition, it can be assumed that the LLM input be generated such that the input prompt (which might be, for instance, a natural language (NL) based input) is provided as the argument for "<initial query>" in the LLM input. It can also be assumed that the LLM input be generated such that the sub-prompt (which might be, for instance, NL representing the sub-prompt, LLM output associated with the sub-prompt, etc.) is provided as the argument for "<sub-prompt>" in the LLM input. In some implementations, as illustrated in this example, the LLM input can include a request for any additional input from the user (or retrieved from other sources) to be taken into account when generating the sub-prompts. As such, in this example, it can be assumed that the LLM input be generated such that the additional input is provided as the argument for <additional input>. The output of the LLM can be, for instance, usable to generate a set of interactive elements, which can be rendered to the user, corresponding to the options responsive to the sub-prompt.

Although a number of examples of input prompts (which may, for instance, refer to tasks to be performed) and templates have been discussed herein, it will be appreciated that the techniques described herein are not limited to these particular input prompts or types of input prompts, and, in fact, the techniques described herein can be used with any suitable type of input prompt. For instance, the input prompt can relate to a task of configuring or controlling a technical system, such as a smart home ecosystem or a robot. For instance, the input prompt can relate to a task to generate code or instructions for an apparatus (e.g., such as a robot). As another example, the input prompt can relate to a complex task with many moving parts, such as planning a trip, which can involve, for instance, selecting suitable dates and times, finding and booking appropriate transport, determining weather forecasts for the area and recommending appropriate attire, determining any other requirements for the trip such as travel documents or vaccination requirements (and finding and booking appropriate appointments), recommending relevant locations (such as landmarks, museums, restaurants, etc.), safety information, etc. As another example, the input prompt can relate to a task for which various sub-tasks can be performed by multiple agents or plugins in furtherance of the task (e.g., booking a table at a restaurant, which might involve a search application to discover which restaurants are within a particular distance and have availability, a calendar application to determine a user's availability, a messaging application to invite other individuals to the table booking, etc.).

In these and other manners, users can be assisted with interactions involving LLMs (e.g., when obtaining responses to complex input prompts). By providing a user interface to assist the user in this manner, the user can be guided through a structured and intuitive process to obtain a response to a complex input prompt (or in other words, to perform a complex task). This can allow users to leverage the ability of LLMs to process natural language, providing flexibility and intuitiveness, while at the same time guiding a user through a structured and easy to use process with a user interface. For instance, the user interface can be provided as a "browsing" experience, which can be intuitive, easy to use, and can reduce the mental load of users. In other words, implementations described herein can assist users to structure their thoughts, help explore different options, navigate through the choices and recommendations, and steer LLMs to generate customized responses. Furthermore, determining the content of a single input prompt to perform a complex task can require trial and error, or can require high levels of skill, training, and/or familiarity with the particular LLM. As such, by guiding the user in the manners described herein, these obstacles can be mitigated.

In other words, implementations described herein can assist users in performing technical tasks by means of a continued and guided human-machine interaction process. This assistance can be objectively provided, for instance, in that the user can add additional context, constraints, or other information throughout the process, and all of this user interaction information can be considered when generating the final response without the user themselves needing to keep track of their interactions, or otherwise determining this information when formulating an initial input prompt. In addition, this assistance can guide the user to enter information or select options that they might not otherwise consider.

Furthermore, implementations described herein can relate to a mechanism enabling user input (e.g., making a selection of one or more options, entering text responsive to a sub-prompt, submitting a command, etc.). For instance, implementations described herein can provide a UI (e.g., a GUI, a VUI, etc.) providing shortcuts (e.g., graphical cards, options, etc.) to set particular conditions associated with the task specified by the input prompt. Furthermore, the user can be presented with UI elements with which they can perform sub-tasks of a complex task (e.g., corresponding to sub-prompts of an input prompt) in furtherance of performance of that task, whereby the user did not themselves need to provide or define the sub-tasks. In some implementations, performance of these sub-tasks can involve interaction with external applications. As such, implementations described herein can provide the user with the ability to easily interact with these external applications without needing to, for instance, manually navigate to and interact with the applications to perform the corresponding sub-tasks.

In some implementations, an LLM can include at least hundreds of millions of parameters. In some of those implementations, the LLM includes at least billions of parameters, such as one hundred billion or more parameters. In some additional or alternative implementations, an LLM is a sequence-to-sequence model, is Transformer-based, and/or can include an encoder and/or a decoder. One non-limiting example of an LLM is GOOGLE'S Pathways Language Model (PaLM). Another non-limiting example of an LLM is GOOGLE'S Language Model for Dialogue Applications (LaMDA). However, and as noted, it should be noted that the LLMs described herein are one example of generative machine learning models that are not intended to be limiting.

The preceding is presented as an overview of only some implementations disclosed herein. These and other implementations are disclosed in additional detail herein.

BRIEF DESCRIPTION OF THE DRAWINGS

FIG. 6 depicts a flowchart that illustrates an example method for determining a response to a complex query, in accordance with various implementations.

DETAILED DESCRIPTION

Figure 1:
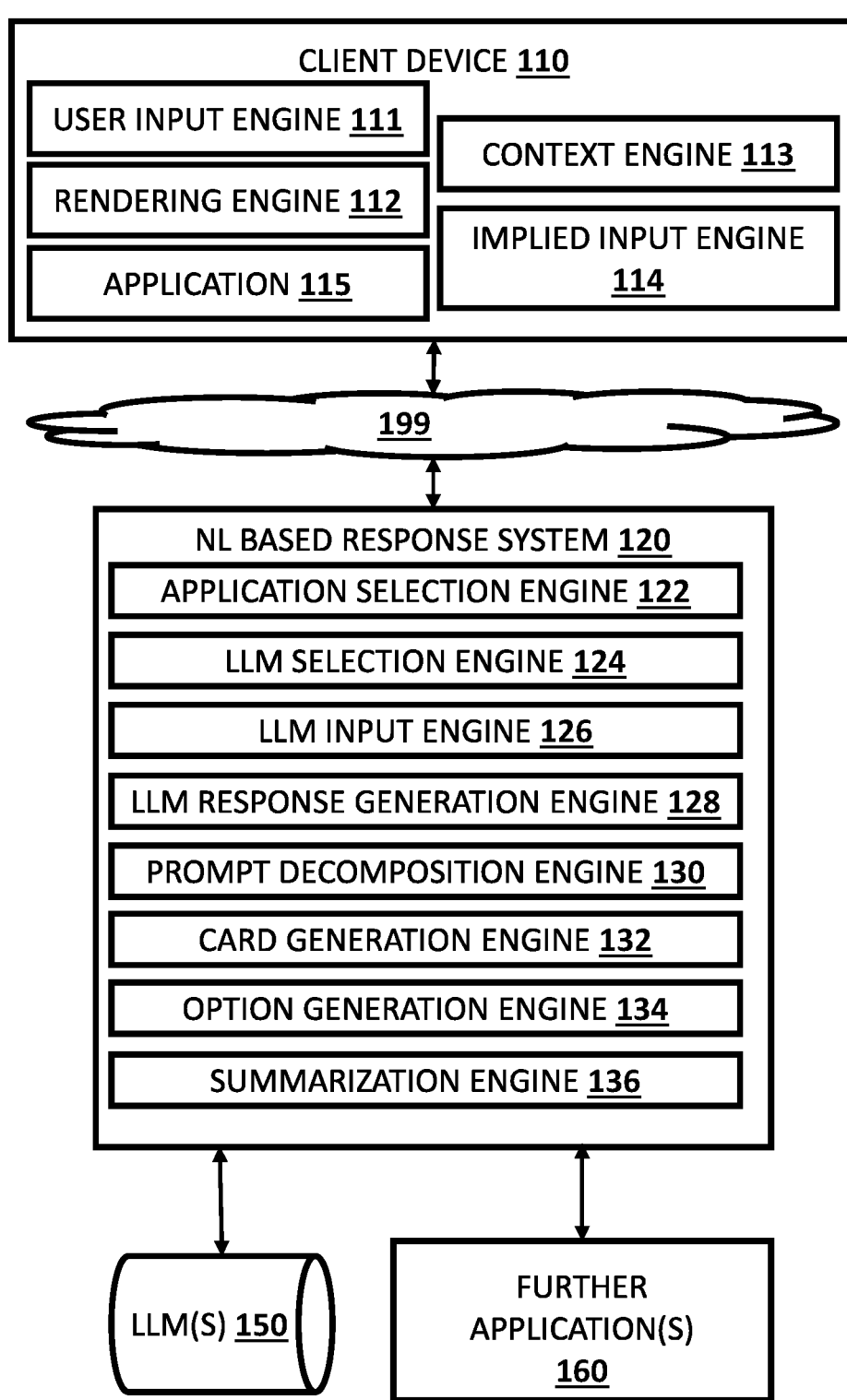
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 (alternatively referred to herein as a user device 110), a natural language (NL) based response system 120, and one or more further applications 160 (i.e., applications external to an LLM or a dialogue application executed on the client device 110 that utilizes the LLM). Although illustrated separately, in some implementations all or aspects of NL based response system 120 and all or aspects of the one or more further applications 160 can be implemented as part of a cohesive system.

In some implementations, all or some aspects of the NL based response system 120 can be implemented locally at the client device 110. In additional or alternative implementations, all or some aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi® LANs, mesh networks, Bluetooth®, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device, etc.). Additional and/or alternative client devices may be provided.

The client device 110 can execute one or more applications, such as application 115, via which queries can be submitted and/or NL based summaries and/or other response(s) to the query can be rendered (e.g., audibly and/or visually). The application 115 can be an application that is separate from an operating system of the client device 110 (e.g., one installed "on top" of the operating system)— or can alternatively be implemented directly by the operating system of the client device 110. For example, the application 115 can be a web browser installed on top of the operating system or can be an application that is integrated as part of the operating system functionality. The application 115 can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch input directed to the client device 110. Some instances of a query described herein can be a query that is formulated based on user input provided by a user of the client device 110 and detected via user input engine 111. For example, the query can be a typed query that is typed via a physical or virtual keyboard, a suggested query that is selected via a touch screen or a mouse, a spoken voice query that is detected via microphone(s) of the client device, or an image query that is based on an image captured by a vision component of the client device.

In various implementations, the client device 110 can include a rendering engine 112 that is configured to provide content (e.g., an NL based summary) for audible and/or visual presentation to a user of the client device 110 using one or more user interface output devices. For example, the client device 110 can be equipped with one or more speakers that enable content to be provided for audible presentation to the user via the client device 110. Additionally, or alternatively, the client device 110 can be equipped with a display or projector that enables content to be provided for visual presentation to the user via the client device 110.

In various implementations, the client device 110 can include a context engine 113 that is configured to determine a context (e.g., current or recent context) of the client device 110 and/or of a user of the client device 110. In some of those implementations, the context engine 113 can determine a context utilizing current or recent interaction(s) via the client device 110, a location of the client device 110, profile data of a profile of a user of the client device 110 (e.g., an active user when multiple profiles are associated with the client device 110), and/or other data accessible to the context engine 113. For example, the context engine 113 can determine a current context based on a current state of a query session (e.g., considering one or more recent queries of the query session), profile data, and/or a current location of the client device 110. For instance, the context engine 113 can determine a current context of "looking for a healthy lunch restaurant in Louisville, Kentucky" based on a recently issued query, profile data, and a location of the client device 110. As another example, the context engine 113 can determine a current context based on which application is active in the foreground of the client device 110, a current or recent state of the active application, and/or content currently or recently rendered by the active application. A context determined by the context engine 113 can be utilized, for example, in supplementing or rewriting a query that is formulated based on user input, in generating an implied query (e.g., a query formulated independent of user input), and/or in determining to submit an implied query and/or to render result(s) (e.g., an NL based summary) for an implied query.

In various implementations, the client device 110 can include an implied input engine 114 that is configured to: generate an implied query independent of any user input directed to formulating the implied query; to submit an implied query, optionally independent of any user input that requests submission of the implied query; and/or to cause rendering of result(s) for an implied query, optionally independent of any user input that requests rendering of the result(s)). For example, the implied input engine 114 can use current context, from context engine 113, in generating an implied query, determining to submit the implied query, and/or in determining to cause rendering of result(s) for the implied query. For instance, the implied input engine 114 can automatically generate and automatically submit an implied query based on the current context. Further, the implied input engine 114 can automatically push result(s) to the implied query to cause them to be automatically rendered or can automatically push a notification of the result(s), such as a selectable notification that, when selected, causes rendering of the result(s). As another example, the implied input engine 114 can generate an implied query based on profile data (e.g., an implied query related to an interest of a user), submit the query at regular or non-regular intervals, and cause corresponding result(s) for the submission(s) to be automatically provided (or a notification thereof automatically provided). For instance, the implied query can be "patent news" based on profile data indicating interest in patents, the implied query periodically submitted, and a corresponding NL based summary result automatically rendered. It is noted that the provided NL based summary result can vary over time in view of e.g., presence of new/fresh search result document(s) over time.

Further, the client device 110 and/or the NL based response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

The NL based response system 120 is illustrated as including an application selection engine 122, an LLM selection engine 124, an LLM input engine 126, an LLM response generation engine 128, a prompt decomposition engine 130, a card generation engine 132, an option generation engine 134, and a summarization engine 136. Some of the engines can be omitted in various implementations. In some implementations, the engines of the NL-based response system are distributed across one or more computing systems.

In various implementations, the application selection engine 122 can, in response to receiving a query, determine one or more external applications 160 to select/invoke. The application selection engine 122 can select applications that are relevant to the query, e.g., determine that the input query is directed towards subject matter within the domain of one or more external applications, and select/invoke one or more of the external applications in response. The set of external applications 160 can include, for instance, one or more search engines, one or more booking engines, one or more calendar engines, one or more messaging engines, one or more smart home configuration/control engines, etc. For instance, the one or more search engines can receive a search request from the NL based response system 120 and perform a search operation on a search space. The search engine can return one or more search results to the NL-based response system 120. The one or more search results can, for example, be used by the LLM input engine 126 when generating or updating sub-prompts, options corresponding to the sub-prompts, and/or a final response. The one or more search engines can include an internet search engine. As another example, the one or more booking engines can receive a request for information for a service, e.g., a hotel, flight tickets, train tickets, event tickets etc., and return the requested information relating to the service. Such information can, for example, include service availability, service prices or the like.

In various implementations, the LLM selection engine 124 can, in response to receiving a query, determine which, if any, of multiple generative model(s) (LLM(s) 150 and/or other generative model(s)) to utilize in generating response(s) to render responsive to the query. For example, the LLM selection engine 124 can select none, one, or multiple generative model(s) to utilize in generating response(s) to render responsive to a query. The LLM selection engine 124 can optionally utilize one or more classifiers and/or rules (not illustrated) in selecting the LLM.

In various implementations, the LLM input engine 126 can, in response to receiving a query, generate LLM input that is to be processed using an LLM in generating an NL based response to the query. The LLM input can include one or more requests to perform certain functions, as well as various content. As described herein, such content can include query content that is based on the query and/or additional content, such as interaction information based on user interaction with various UI elements, additional input provided by the user, and/or contextual information derived from the one or more further applications 160. In some implementations, the LLM input can be generated based on one or more templates available to the LLM input engine 126.

In various implementations, the LLM response generation engine 128 can process LLM input, that is generated by the LLM input engine 126, using an LLM, to generate an NL based response. The LLM response generation engine 128 can utilize one or more LLMs 150.

Figure 5:
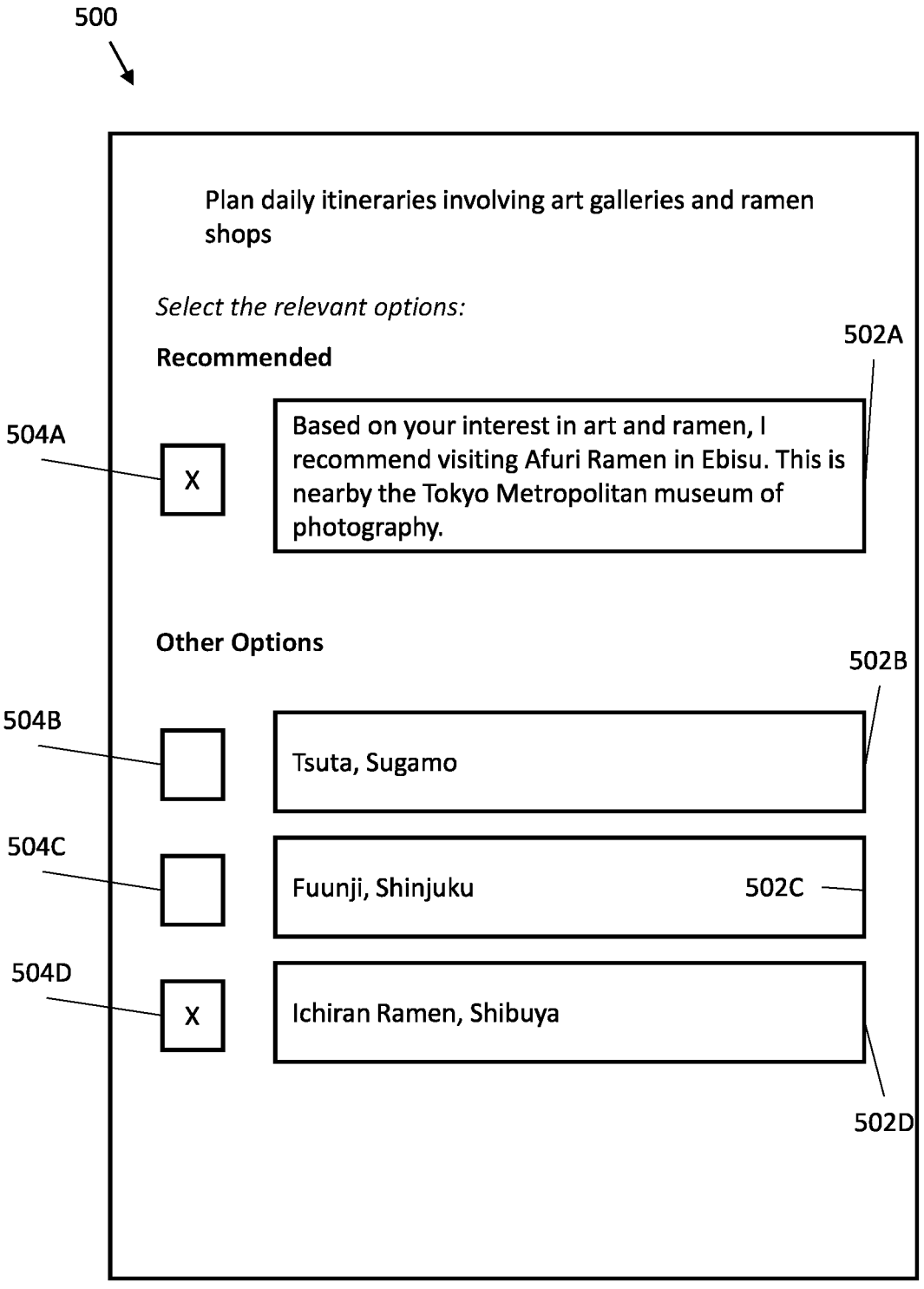
FIG. 5 depicts an example of a GUI including options corresponding to a sub-prompt that can be rendered at a user device, in accordance with various implementations.

In various implementations, the prompt decomposition engine 130 can process an input prompt/query to decompose the input prompt into a plurality of sub-prompts. The prompt decomposition engine 130 can utilize one or more LLMs 150 to break down the input query/prompt into the plurality of sub-prompts. In some implementations, the prompt decomposition engine 130 can decompose the input prompt into a prompt decomposition tree (also referred to herein as a tree-like hierarchical structure), for example as shown in FIG. 5. The sub-prompts can be determined based on the input prompt explicitly including a plurality of discrete integers mapping on to a plurality of sub-prompts and/or the sub-prompts can be inferred based on the input prompt. In various implementations, the prompt decomposition engine 130 can perform all or aspects of block 604 of method 600 of FIG. 6.

Figure 4A:
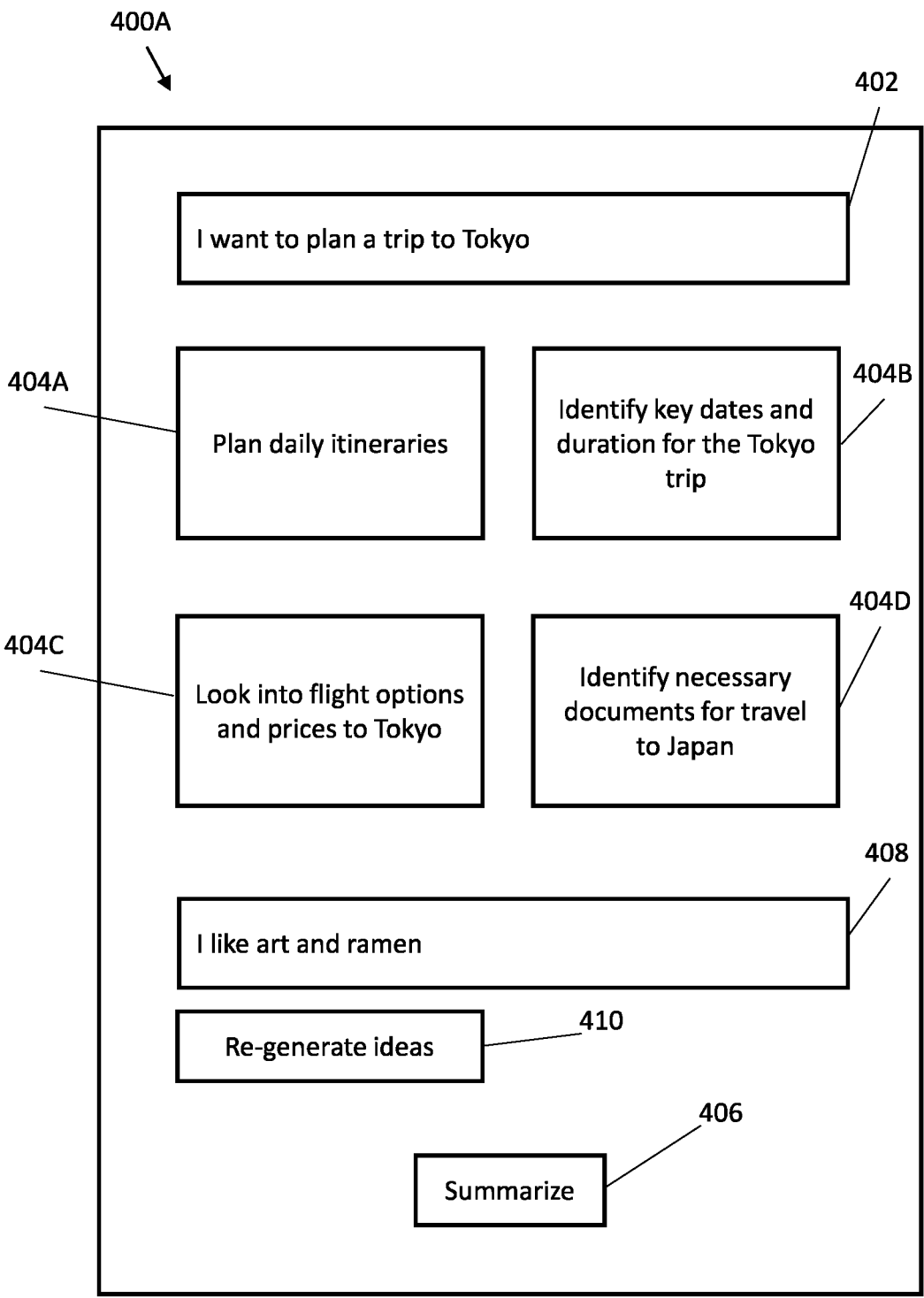
FIGS. 4A and 4B depict examples of GUIs including graphical cards that can be rendered at a user device, in accordance with various implementations.
Figure 4B:
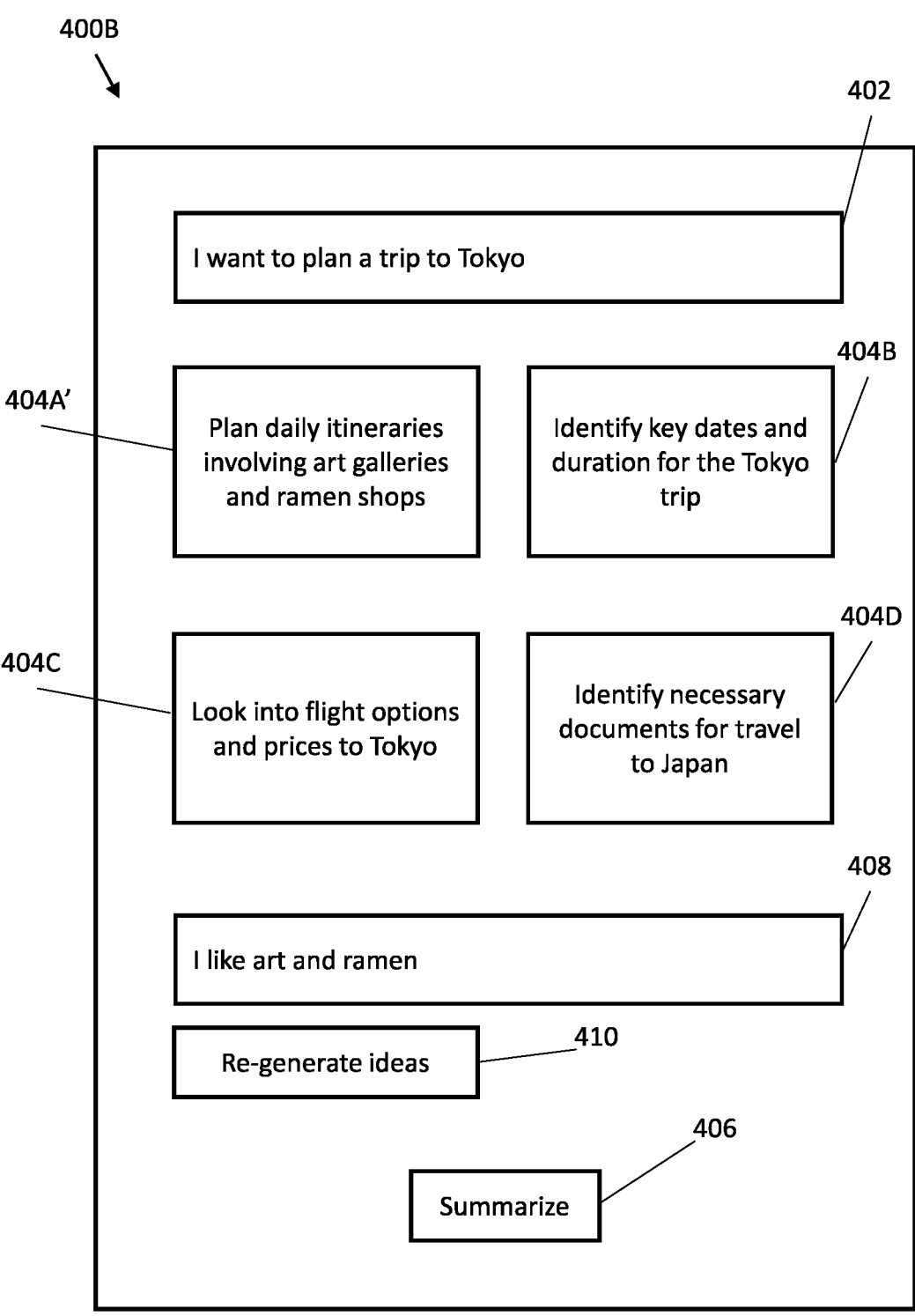

In various implementations, the card generation engine 132 can generate a set of UI elements corresponding to the plurality of sub-prompts, for instance, based on processing output from the prompt decomposition engine 130. The UI elements corresponding to the plurality of sub-prompts can include GUI elements, such as graphical cards (e.g., as illustrated in the GUI of FIG. 4A and FIG. 4B). In various implementations, the card generation engine 132 can perform all or aspects of blocks 604 and 606 of method 600 of FIG. 6.

In various implementations, the option generation engine 134 can generate one or more interactive elements corresponding to a sub-prompt, for instance, based on processing the sub-prompt or a portion of the output from the prompt decomposition engine 130 corresponding to the sub-prompt. The interactive elements can represent options for responding to the sub-prompt. For instance, the interactive elements can include user selectable checkboxes to allow a user to select one or more options for responding to the sub-prompt (e.g., as illustrated in the GUI of FIG. 5).

In various implementations, the summarization engine 136 can generate a final response to an input prompt by summarizing the user interaction. The final response can be generated by the summarization engine 136, for instance, based on processing the initial input prompt, information indicative of user interaction with the UI elements and/or the interactive elements, additional input received from the user and/or one or more of the further applications 160, etc. The final response can be generated by the summarization engine 136 in response to a determination that one or more termination conditions are satisfied. The one or more termination conditions can be explicit (e.g., based on a user input indicative of a request to provide a final response) or implicit (e.g., based on a response being determined for a threshold number of sub-prompts). In various implementations, the summarization engine 136 can perform all or aspects of block 612 and 614 of method 600 of FIG. 6.

Figure 2:
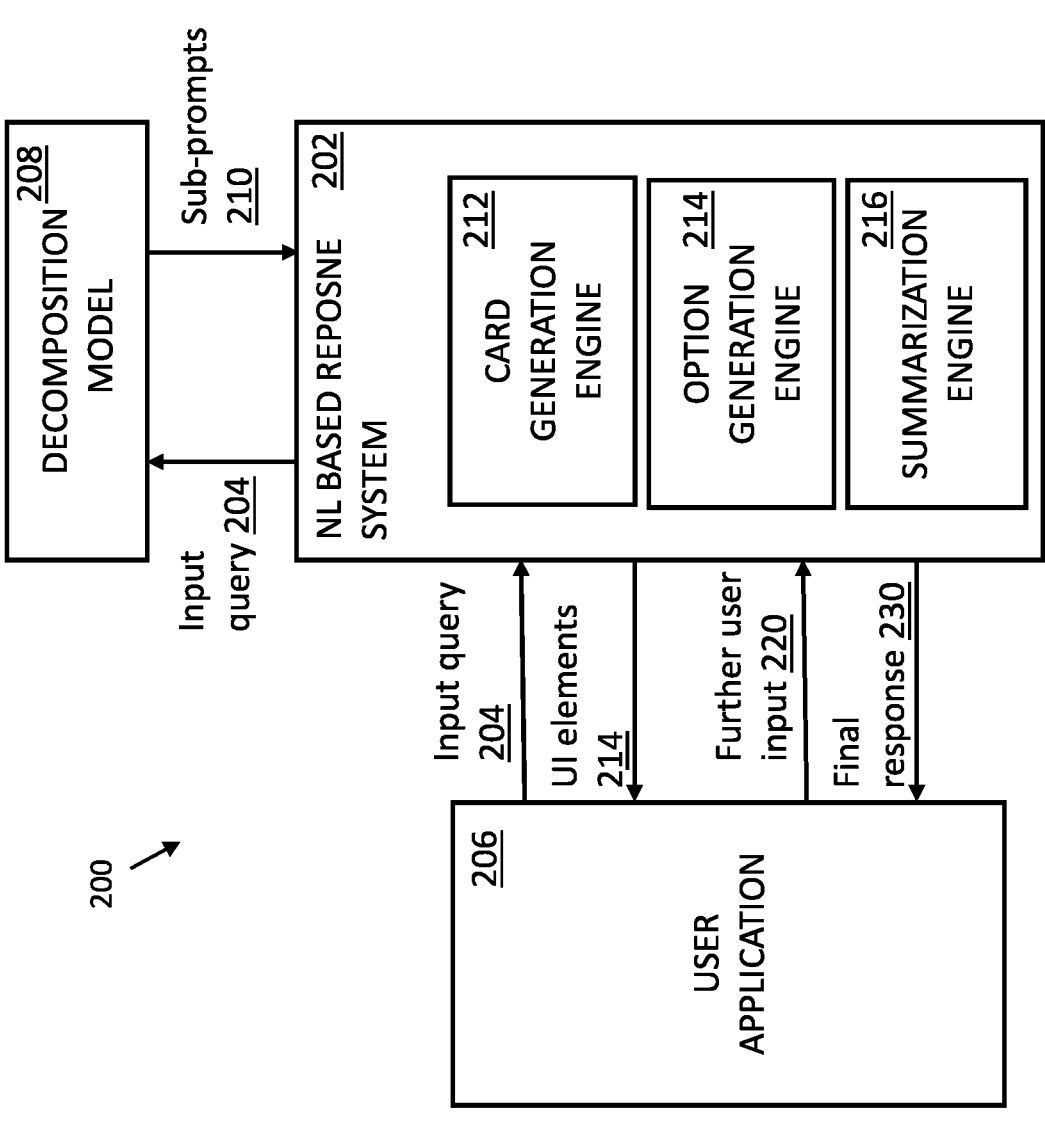
FIG. 2 depicts an example process flow for responding to an input prompt to an LLM, in accordance with various implementations.

Turning now to FIG. 2, an example process flow 200 for responding to an input prompt to an LLM is illustrated. The process flow may be performed by one or more computing systems, such as the system described herein with respect to FIG. 7.

A computer system, such as an NL-based response system 202 (e.g., the NL based response system 120 described herein in relation to FIG. 1), receives an input query 204 (also referred to herein as an input prompt) via a user application 206. The input query 204 includes natural language input that explicitly and/or implicitly raises a query. The input query 204 is processed by a decomposition model 208, which decomposes the input query into a plurality of relatively simple sub-prompts 210 corresponding to the input query 204. For instance, the decomposition model 208 can use one or more LLM(s), as described herein. A card generation engine 212 (e.g., the card generation engine 132 as described in relation to FIG. 1) uses the sub-prompts 210 to generate a set of UI elements 214 corresponding to the sub prompts 210 which can be output to a user via the user application 206 on the user device. Responsive to detecting user interaction with a particular UI element of the set of UI elements 214, option generation engine 214 (e.g., the option generation engine 134 as described in relation to FIG. 1) can generate one or more interactive elements corresponding to the particular UI element, using the sub-prompt corresponding to the particular UI element. For instance, the option generation engine 214 can use one or more LLMs (e.g., the same LLM(s) as the decomposition model 208, or otherwise). The one or more interactive elements can be output to the user via the user application 206 on the user device. Further user input 220 can be received from the user application 206 (e.g., in relation to the UI elements corresponding to the set of sub-prompts, the interactive elements corresponding to a particular sub-prompt, and/or any additional user input). A summarization engine 216 (e.g., the summarization engine 136 as described in relation to FIG. 1) can generate a final response 230 using the further user input 220, and in some implementations, the input query 204, the sub-prompts 210, and/or any information retrieved from other sources. For instance, the summarization engine 216 can use one or more LLMs (e.g., the same LLM(s) as the decomposition model 208 and/or the option generation engine 212, or otherwise).

In some implementations, an application selection engine (e.g., the application selection engine 122 described in relation to FIG. 1) can process the sub-prompts 210 to determine if any of the sub-prompts 210 are addressable by one or more external applications. For each sub-prompt determined to be addressable by an external application, the application selection engine can invoke the respective external application using the sub-prompt, or cause the card generation engine 212 and/or the option generation engine 214 to provide UI elements 214 and/or interactive elements to allow a user to do so. The external application can then process data from the sub-prompt to generate a response and provide the response to the NL based response system 202.

The input query 204 is, in some examples, received in the form of an input text query. The input query 204 can, for example, originate as text input manually by a user of the user application 206. Alternatively, or additionally, the input query 204 can originate from a spoken input to the user application 206, e.g., a spoken query input after invoking the user application 206. The spoken input is converted to the input query by a speech-to-text engine running on the client device (either as part of the user application 206, or accessible by the user application 206). The input text query 204 is, in some examples, part of an ongoing human-computer dialogue, e.g., a sequence of input queries and their corresponding responses from the NL based response system.

As an example, an input query 204 may be "What flights and hotels are available to Japan in the Sakura season?". Following the example above, the input query 304 "What flights and hotels are available to Japan in the Sakura season?" may be decomposed into the sub-prompts/queries "Determine when Sakura season is in Japan", "Identify which airports should be used to fly to Japan" and "Look into available and affordable accommodations in Japan during Sakura season". The card generation engine 212 can generate corresponding UI elements to these sub-prompts, which can be rendered at the user device.

Upon interaction with a particular UI element, for instance, the UI element corresponding to "Determine when Sakura season is in Japan", option generation engine 214 can generate (or provide if the interactive elements have already been generated, as described herein) one or more interactive elements corresponding to the sub-prompt "Determine when Sakura season is in Japan". For instance, the one or more interactive elements can include options for responding to the sub-prompt, which in this case might include, for instance, a text entry field or a calendar to allow the user to enter dates for Sakura season in Japan, or a checkbox associated with a response to this sub-prompt generated by an LLM to allow a user to indicate that this response is correct. In some implementations, the response to this sub-prompt can be fed into updating the other UI elements, the generation of (or updating of) further interactive elements rendered to the user, and in generating the final response.

In some implementations, the application selection engine can determine that an external application can be invoked to determine a response to this sub-prompt. For instance, the application selection engine can compare the sub-prompt to respective domains of expertise of the external applications to determine if the subject matter of the sub-prompt falls within the domain of expertise of an external application, i.e., is addressable by an external application. For example, the application selection engine can determine that the sub-prompt "Determine when Sakura season is in Japan" is addressable by a search engine application. The application selection engine can then cause a UI element or an interactive element to be generated which is selectable to invoke the respective external application for the sub-prompt based on determining that the sub-prompt falls within its respective domains of expertise. The application selection engine can extract pertinent information from the sub-prompt to use in respective application-program interfaces (APIs) of the external application to fill in elements of the APIs of the external applications. A response can then be retrieved by the external application once it is invoked. By allowing a user to invoke the application via a UI element or an interactive element, the user can be provided with certainty of the source of the response which may be considered to be reliable (e.g., because of the applications relevant domain of expertise), as compared to, for instance, automatically invoking the application behind the scenes whereby the user can be unaware of the source of the response. This can be particularly important since in some situations LLMs can provide inaccurate responses (otherwise termed hallucination), and therefore certainty as to the source of information output by a NL based response system (such as NL based response system 202) can be required. Furthermore, this improves security and privacy as users can choose which external applications are invoked, and for what purpose.

Once enough of sub-prompts 210 have been processed, or if a user explicitly requests a final response, the summarization engine 216 can generate a final response 230 to the original input query 204 "What flights and hotels are available to Japan in the Sakura season?" (e.g., based on processing all of the user interaction information using an LLM). The final response 230 can then be rendered to the user by the user application 206.

Figure 3:
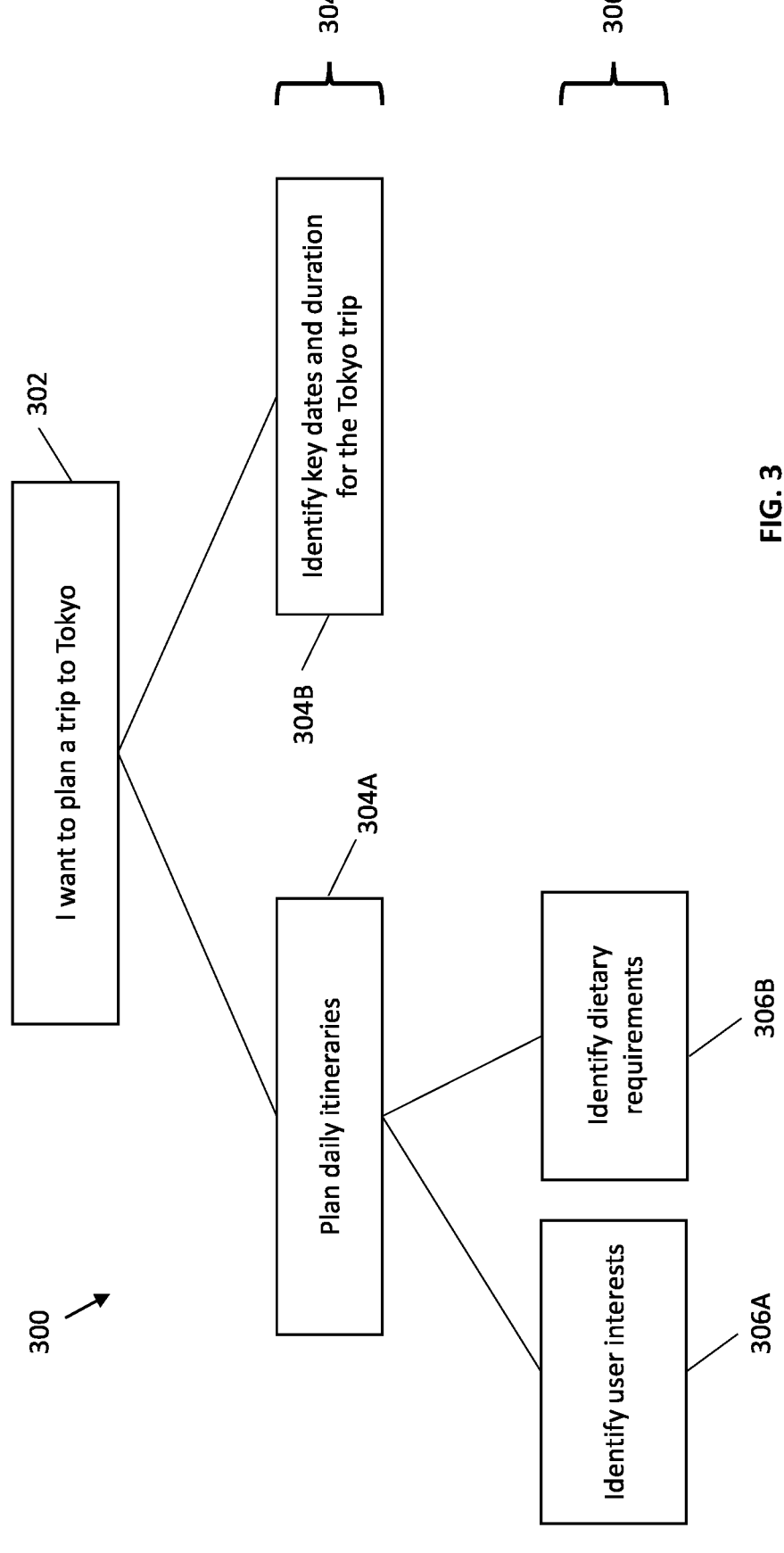
FIG. 3 depicts an example of a tree-like hierarchical structure, in accordance with various implementations.

Turning now to FIG. 3, FIG. 3 illustrates an example of a tree-like hierarchical structure 300 (otherwise referred to herein as a prompt tree 300). The prompt tree 300 includes a first layer that includes a root node 302 corresponding to a full input prompt/query, which in the example shown is "I want to plan a trip to Tokyo".

The input prompt is broken down into a plurality of sub-prompts, in this example two sub-prompts, in a second layer of nodes 304 of the prompt tree. In this example, the sub-prompts are "Plan daily itineraries" 304A and "Identify key dates and duration for the Tokyo trip" 304B. In this case, one of the prompts is broken down into further sub-prompts, so this prompt in the first layer of nodes 304 in this example includes a branch node 304A. The other of the sub-prompts in the first layer of nodes 304 in this example is a leaf node 304B that corresponds to sub-prompt that cannot be (or is not) broken down further. In some implementations, there may be a limit on the number of layers in the prompt tree 300, the number of total nodes in the prompt tree 300, and/or the number of nodes in each layer of the prompt tree 300.

One or more of the sub-prompts that form the second layer of the prompt tree 300 may be further broken down into a third layer 306 of sub-prompts. Each node in the third layer 306 may itself be a branch node (i.e., correspond to a sub-prompt that can be (or is) broken down further into simpler sub-prompts) or a leaf node (e.g., correspond to a sub-prompt that cannot be (or is not) broken down further, i.e., a simple sub-prompt, or a sub-prompt that is actionable by an external application). In the example shown, the third layer 306 of sub-prompts has two leaf nodes 306A and 306B, corresponding to the simple sub-prompts "Identify user interests" 306A, "Identify dietary requirements" 306B.

Turning now to FIG. 4A, an example of a GUI 400A that can be rendered at a user device is depicted. As depicted in FIG. 4A, GUI 400A can include an entry field 402 for an input prompt, a set of UI elements (in this case graphical cards 404A, 404B, 404C, and 404D), and a selectable button 406 for requesting a final response. As also depicted in FIG. 4A, in some implementations, GUI 400A can include an entry field 408 for receiving additional input, and a selectable button 410 for requesting the graphical cards 404A, 404B, 404C, and 404D to be updated based on entered additional input.

Although the entry field 402 for an input prompt is depicted as a text field in FIG. 4A, it should be understood that the GUI 400A is not limited to this example. For instance, as described herein, in some implementations, the input prompt can be provided as an image, a spoken utterance (or a transcription thereof), a selection of existing text, etc. Furthermore, in some implementations, the entry field 402 may not be usable to enter an input prompt. Instead, it can display an input prompt already provided by a user. In this example, the input prompt "I want to plan a trip to Tokyo" is shown in the entry field 402.

The set of graphical cards 404A, 404B, 404C, and 404D can represent sub-prompts of the input prompt shown in entry field 402. For instance, the input prompt can be decomposed (at the user device, or a server in communication with the user device), as described herein, to generate the sub-prompts. In this example, the graphical cards 404A, 404B, 404C, and 404D include a graphical card 404A including the sub-prompt text "Plan daily itineraries", a graphical card 404B including the sub-prompt text "Identify key dates and duration for the Tokyo trip", a graphical card 404C including the sub-prompt text "Look into flight options and process to Tokyo", and a graphical card 404D including the sub-prompt text "Identify necessary documents for travel to Japan". In some implementations, selection of one of the graphical cards 404A, 404B, 404C, or 404D can result in the GUI 400A being updated to include one or more options responsive to the sub-prompt of the selected graphical card, as described, for instance, in relation to FIG. 5. In some implementations, selection of one of the graphical cards 404A, 404B, 404C, or 404D can result in the sub-prompt of the selected graphical card itself being decomposed into further sub-prompts, with the GUI 400A being updated accordingly to display graphical cards corresponding to the further sub-prompts. In some implementations, selection of one of the graphical cards 404A, 404B,

404C, or 404D can result in a response to the corresponding sub-prompt being determined without further interaction from the user (e.g., if user selection is indicative of an answer to a question present in the graphical card, if user selection invokes an external application to provide a response to the sub-prompt, etc.).

The selectable button 406 for requesting a final response can cause, upon selection, a final response to be provided to the user (e.g., based on processing the user interaction using an LLM). In other words, selection of the selectable button 406 can be interpreted as a request to provide a final response. In some implementations, the final response can additionally or alternatively be provided based on other termination conditions being satisfied, as described herein. As such, in some implementations, the selectable button 406 can be excluded from the GUI 400A.

In some implementations, the GUI 400A includes an entry field 408 for receiving additional input. Similar to the entry field 402 for the input prompt, although the entry field 408 for receiving additional input is illustrated as a text entry field, it should be understood that it is not limited to this example. In this example, the user has provided the additional input text "I like art and ramen" in the entry field 408.

In some implementations, the GUI 400A further includes a selectable button 410 for requesting the graphical cards 404A, 404B, 404C, and 404D to be updated based on entered additional input. Although, the selectable button 410 is shown in FIG. 4A as being selectable to request the graphical cards 404A, 404B, 404C, and 404D to be updated based on additional input, in some implementations, the selectable button 410 can additionally, or alternatively, cause the additional input to be stored for use in generating interactive elements corresponding to a selected graphical card, and/or in generating the final response. In some implementations, upon selection of the selectable button 410, the sub-prompts can be regenerated by decomposing the input prompt while also considering the additional input. One or more of the graphical cards 404A, 404B, 404C, and 404D can then be updated based on the regenerated sub-prompts. For instance, in this example, responsive to selection of the selectable button 410, the graphical card 404A can be updated based on the additional input, as illustrated in FIG. 4B.

Turning now to FIG. 4B, an example of a GUI 400B that can be rendered at a user device is depicted. The GUI 400B is an updated version of GUI 400A in response to entry of the additional input "I like art and ramen" in entry field 408 and selection of selectable button 410. In particular, graphical card 404A of FIG. 4A has been replaced with graphical card 404A', which includes the sub-prompt text "Plan daily itineraries involving art galleries and ramen shops", based on the additional input.

As mentioned, upon selection of one of the graphical cards 404A, 404B, 404C, and 404D, the GUI 400B can be updated to include one or more options responsive to the sub-prompt of the selected graphical card. In this example, the graphical card 404A' may be selected. Responsive to this selection, GUI 500 of FIG. 5 can be rendered at the user device.

Referring now to FIG. 5, the GUI 500 can include one or more interactive elements (e.g., options 502A, 502B, 502C, and 502D, and corresponding checkboxes 504A, 504B, 504C, and 504D) corresponding to the sub-prompt of the selected graphical cards. For instance, the options 502A, 502B, 502C, and 502D can correspond to options for responses to the sub-prompt. The corresponding checkboxes 504A, 504B, 504C, and 504D can allow the user to indicate a selection of one or more of the options 502A, 502B, 502C, or 502D. In this example, the user has selected checkbox 504A corresponding to option 502A which includes the text "Based on your interest in art and ramen, I recommend visiting Afuri Ramen in Ebisu. This is nearby the Tokyo Metropolitan Museum of photography.", and checkbox 504D corresponding to option 502D which includes the text "Ichiran Ramen, Shibuya". The user has not selected checkbox 504B corresponding to option 502B which includes the text "Tsuta, Sugamo" or checkbox 504C corresponding to option 502C which includes the text "Fuunji, Shinjuku". As such, the selected options 502A and 502D (or the text thereof) can be stored and used in an input to generate the final response, as well as in some implementations, in updating the graphical cards 404A, 404B, 404C, and 404D, and/or in generating subsequent options for other sub-prompts. In some implementations, the non-selection of option 502B and 502C can additionally or alternatively be considered for these purposes.

As illustrated in FIG. 5, in some implementations, the GUI 500 can include other text, such as text indicating the sub-prompt currently being dealt with (in this example "Plan daily itineraries involving art galleries and ramen shops"), and text to guide the user on how to interact with the interactive elements rendered (in this example "Select the relevant options:"). Additionally, or alternatively, in some implementations, the GUI 500 can include an indication that one or more of the interactive elements are recommended (e.g., based on previous user input), and/or that one or more of the interactive elements are not necessarily recommended but are otherwise available options.

It will be appreciated that although the interactive elements of GUI 500 include options 502A, 502B, 502C, and 502C and corresponding checkboxes 504A, 504B, 504C, and 504D, the interactive elements are not limited to these examples. For instance, in some implementations, the options themselves (e.g., elements including text indicating a response to a sub-prompt) can be selectable, the interactive elements can include other forms of user entry (e.g., such as text entry fields, calendars, toggle switches, maps, etc.), and/or the interactive elements can be selectable to invoke one or more external applications.

Turning now to FIG. 6, a flowchart is depicted that illustrates an example method 600 of assisting a user to determine response to a complex query is depicted. The method 600 corresponds to the process flow 200 described in relation to FIG. 2. For convenience, the operations of the method 600 are described with reference to a system that performs the operations. This system of the method 600 includes one or more processors, memory, and/or other component(s) of computing device(s) (e.g., the NL-based response system 120 of FIG. 1). Moreover, while operations of the method 600 are shown in a particular order, this is not meant to be limiting. One or more operations may be reordered, omitted, and/or added.

At block 602, an input prompt/query for an LLM is received from a user device. The prompt includes an input text query. The input prompt can include an input text query. The query can be one formulated based on user interface input at a user device, such as typed input, voice input, input to cause an image to be captured or selected, etc. The text query can be, for example, a voice query, a typed query, or an inferred/parameterless query. In some implementations, when the query includes content that is not in textual format, the system can convert the query to a textual format or other format. For example, if the query is a voice query the system can perform automatic speech recognition (ASR) to convert the voice query into textual format.

The query can alternatively be an implied query, such as one formulated and/or submitted independent of any user input directed to formulating the implied query. For example, the query can be an implied query that is automatically generated based on profile data and that is automatically submitted. For instance, the implied query can be "machine learning", based on profile data indicating interest in machine learning topic(s). As another example, the query can be an implied query that is automatically generated and/or automatically submitted based on a current and/or recent context. As yet another example, the query can be an implied query that is submitted based on the user providing some indication of a desire to perform a search (e.g., pushing a search button, performing a search touch gesture, accessing a particular screen or state of an application), but that is generated automatically based on content currently being displayed at a client device, location, time of day, and/or other context signal(s).

At block 604, the system generates first LLM output that is usable to generate a set of UI elements. The first LLM output is generated based on processing the input prompt using a LLM. Each of the UI elements, included in the set of UI elements, is associated with a corresponding sub-prompt of the input prompt.

In some implementations, the system generates a first LLM input based on the input prompt. The first LLM input can include a request to decompose the input prompt into the corresponding sub-prompts. As such, the system can process, using the LLM, the first LLM input to generate the first LLM output.

At block 606, the system causes, based on the first LLM output, the set of UI elements to be rendered at a user device. For instance, the system can generate the set of UI elements based on the first LLM output. The system can then cause the set of UI elements to be rendered at the user device.

At block 608, the system receives further user input based on user interactions with one or more of the UI elements of the set of UI elements. In some implementations, the user input can be in relation to the UI elements of the set of UI elements directly.

In some implementations, the system can detect user selection of a particular UI element, of the set of UI elements. Responsively, the system can cause rendering of one or more interactive elements associated with the particular UI element at the user device. The system can further detect a corresponding user interaction with at least one of the one or more interactive elements associated with the particular UI element. The further user input can therefore include at least information indicative of the corresponding user interaction with the particular UI element.

In some implementations, the one or more interactive elements can be generated based on generating third LLM output usable to generate the one or more interactive elements. The third LLM output can be generated based on processing at least a portion of the first LLM output associated with the particular UI element using the LLM. For instance, the system can generate a third LLM input based on the at least portion of the first LLM output associated with the particular UI element. The third LLM input can include a request to provide one or more candidate responses to the corresponding sub-prompt associated with the particular UI element. The third LLM output can therefore be generated based on processing the third LLM input using the LLM. The one or more interactive elements can, for instance, be generated in response to the user selection of the particular UI element and/or proactively generated prior to the user selection of the particular UI element.

In some implementations, the first LLM output is further usable to generate the one or more interactive elements associated with the particular UI element. In this way, a further inference using the LLM to generate the interactive elements is not required.

In some implementations, the system can receive additional NL based input (e.g., subsequent to receiving the input prompt). The additional NL based input can be used as part of the further user input. Additionally, or alternatively, the system can, in response to receiving the additional NL based input, generate, based on processing the input prompt and the additional NL based input using the LLM, updated first LLM output usable to update the set of UI elements based on the additional NL based input. The system can then cause the set of UI elements rendered at the user device to be updated based on the updated first LLM output. Additionally, or alternatively, the one or more interactive elements can be generated based on processing the at least a portion of the first LLM output and the additional NL based input using the LLM.

At block 610, the system determines that one or more termination conditions are satisfied. Determining that the one or more termination conditions are satisfied can include determining that a user input indicative of a request to provide a final response has been received. Additionally, or alternatively, determining that the one or more termination conditions are satisfied can include determining that a response has been determined for at least a threshold number of the corresponding sub-prompts associated with the set of UI elements.

At block 612, responsive to block 610, the system generates a final response to the input prompt. The system generates the final response based on generating second LLM output that is usable to generate the final response. The second LLM output is generated based on processing the further user input using the LLM. In some implementations, the system can generate a second LLM input based on the further user input. The second LLM input can include a request to summarize the user interaction to provide the final response. The system can therefore generate the final response based on processing the second LLM input using the LLM.

At block 614, the system causes the final response to be rendered at the user device. For example, the system can cause the final response to be rendered visually and/or audibly.

Figure 7:
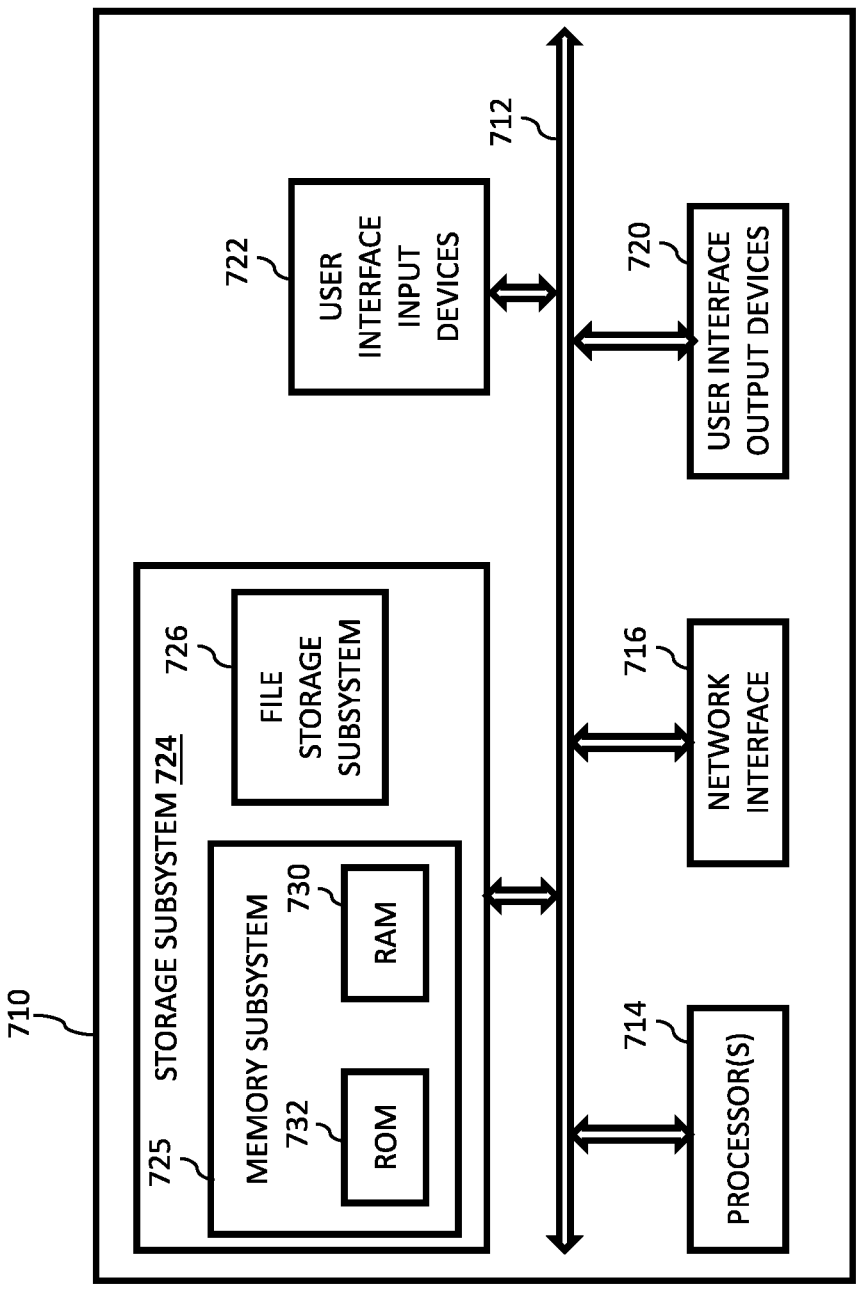
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may include one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some, or all, of the modules described herein. For example, the storage subsystem 724 may include the logic to perform selected aspects of the methods disclosed herein, as well as to implement various components depicted in FIG. 1.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided and includes: receiving an input prompt for a large language model (LLM), generating, based on processing the input prompt using a LLM, first LLM output that is usable to generate a set of user interface (UI) elements, wherein each UI element, of the set of UI elements, is associated with a corresponding sub-prompt of the input prompt; causing, based on the first LLM output, the set of UI elements to be rendered at a user device; receiving further user input based on user interactions with one or more of the UI elements of the set of UI elements; and in response to determining that one or more termination conditions are satisfied: generating a final response to the input prompt based on generating second LLM output that is usable to generate the final response, the second LLM output generated based on processing the further user input using the LLM; and causing the final response to be rendered at the user device.

These and other implementations of technology disclosed herein can optionally include one or more of the following features.

In some implementations, generating the first LLM output based on processing the input prompt and using the LLM includes generating a first LLM input based on the input prompt, wherein the first LLM input includes a request to decompose the input prompt into the corresponding sub-prompts; and processing, using the LLM, the first LLM input to generate the first LLM output.

In some additional or alternative implementations, generating the second LLM output based on processing the further user input using the LLM includes: generating a second LLM input based on the further user input, wherein the second LLM input includes a request to summarize the user interaction to provide the final response; and processing, using the LLM, the second LLM input to generate the second LLM output.

In some additional or alternative implementations, receiving further user input based on user interactions with one or more of the UI elements, of the set of UI elements, includes: in response to detecting user selection of a particular UI element, of the set of UI elements, causing rendering of one or more interactive elements associated with the particular UI element; and detecting a corresponding user interaction with at least one of the one or more interactive elements associated with the particular UI element, wherein the further user input includes at least information indicative of the corresponding user interaction with the particular UI element.

In some versions of those implementations, the one or more interactive elements are generated based on generating third LLM output usable to generate the one or more interactive elements, the third LLM output generated based on processing at least a portion of the first LLM output associated with the particular UI element using the LLM.

In some additional or alternative versions of those implementations, generating the third LLM output based on processing the at least portion of the first LLM output associated with the particular UI element using the LLM includes: generating a third LLM input based on the at least portion of the first LLM output associated with the particular UI element, wherein the third LLM input includes a request to provide one or more candidate responses to the corresponding sub-prompt associated with the particular UI element; and processing, using the LLM, the third LLM input to generate the third LLM output.

In some additional or alternative versions of those implementations the one or more interactive elements are generated in response to the user selection of the particular UI element. In some additional or alternative versions of those implementations, wherein the one or more interactive elements are proactively generated prior to the user selection of the particular UI element.

In some versions of those implementations, the first LLM output is further usable to generate the one or more interactive elements associated with the particular UI element.

In some additional or alternative implementations, the method further includes receiving additional NL based input, wherein the additional NL based input is received subsequent to receiving the input prompt; wherein generating the final response is based on processing the further user input and the additional NL based input using the LLM. In some versions of those implementations, the method further includes, in response to receiving the additional NL based input, generating, based on processing the input prompt and the additional NL based input using the LLM, updated first LLM output usable to update the set of UI elements based on the additional NL based input; and causing, based on the updated first LLM output, the set of UI elements rendered at the user device to be updated.

In some additional or alternative implementations, determining that the one or more termination conditions are satisfied includes determining that a user input indicative of a request to provide a final response has been received. In some additional or alternative implementations determining that the one or more termination conditions are satisfied includes determining that a response has been determined for at least a threshold number of the corresponding sub-prompts associated with the set of UI elements.

In some additional or alternative implementations, causing the set of UI elements to be rendered at the user device includes causing a GUI to be rendered on a display of the user device, the first GUI comprising the set of UI elements, wherein the set of UI elements are rendered on the display of the user device as a set of selectable cards. In some versions of those implementations, the GUI includes a GUI element to receive additional NL based input, and wherein the GUI element is separate from the set of UI elements. In some additional or alternative versions of those implementations, the GUI includes a user selectable GUI element for requesting a final response. In some additional or alternative versions of those implementations, the method includes, in response to user selection of a particular UI element of the set of UI elements, causing the GUI to be updated to include one or more user selectable GUI elements associated with the particular UI element.

In some additional or alternative implementations, the method further includes selecting a given sub-prompt, of the corresponding sub-prompts, associated with a given UI element, included in the set of UI elements; generating, based on processing at least a portion of the first LLM output associated with the given sub-prompt and using the LLM, further first LLM output usable to generate an additional set of UI elements, wherein each UI element, of the additional set of UI elements, is associated with a corresponding further sub-prompt of the given sub-prompt.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving an input prompt for a large language model (LLM);

generating, based on processing the input prompt using a LLM, first LLM output that is usable to generate a set of user interface (UI) elements, wherein each UI element, of the set of UI elements, is associated with a corresponding sub-prompt of the input prompt;

causing, based on the first LLM output, the set of UI elements to be rendered at a user device;

receiving further user input based on user interactions with one or more of the UI elements of the set of UI elements; and in response to determining that a response has been determined for at least a threshold number of the corresponding sub-prompts associated with the set of UI elements:

generating a final response to the input prompt based on generating second LLM output that is usable to generate the final response, the second LLM output generated based on processing the further user input using the LLM; and causing the final response to be rendered at the user device.

2. The method of claim 1, wherein generating the first LLM output based on processing the input prompt and using the LLM comprises:

generating a first LLM input based on the input prompt, wherein the first LLM input comprises a request to decompose the input prompt into the corresponding sub-prompts; and processing, using the LLM, the first LLM input to generate the first LLM output.

3. The method of claim 1, wherein generating the second LLM output based on processing the further user input using the LLM comprises:

generating a second LLM input based on the further user input, wherein the second LLM input comprises a request to summarize the user interaction to provide the final response; and processing, using the LLM, the second LLM input to generate the second LLM output.

4. The method of claim 1, wherein receiving further user input based on user interactions with one or more of the UI elements, of the set of UI elements, comprises:

in response to detecting user selection of a particular UI element, of the set of UI elements, causing rendering of one or more interactive elements associated with the particular UI element; and detecting a corresponding user interaction with at least one of the one or more interactive elements associated with the particular UI element, wherein the further user input comprises at least information indicative of the corresponding user interaction with the particular UI element.

5. The method of claim 4, wherein the one or more interactive elements are generated based on generating third LLM output usable to generate the one or more interactive elements, the third LLM output generated based on processing at least a portion of the first LLM output associated with the particular UI element using the LLM.

6. The method of claim 5, wherein generating the third LLM output based on processing the at least portion of the first LLM output associated with the particular UI element using the LLM comprises:

generating a third LLM input based on the at least portion of the first LLM output associated with the particular UI element, wherein the third LLM input comprises a request to provide one or more candidate responses to the corresponding sub-prompt associated with the particular UI element; and processing, using the LLM, the third LLM input to generate the third LLM output.

7. The method of claim 4, wherein the one or more interactive elements are generated in response to the user selection of the particular UI element.

8. The method of claim 4, wherein the one or more interactive elements are proactively generated prior to the user selection of the particular UI element.

9. The method of claim 4, wherein the first LLM output is further usable to generate the one or more interactive elements associated with the particular UI element.

10. The method of claim 1, further comprising:

receiving additional NL based input, wherein the additional NL based input is received subsequent to the receiving the input prompt;

wherein generating the final response is based on processing the further user input and the additional NL based input using the LLM.

11. The method of claim 10, further comprising:

in response to receiving the additional NL based input, generating, based on processing the input prompt and the additional NL based input using the LLM, updated first LLM output usable to update the set of UI elements based on the additional NL based input; and causing, based on the updated first LLM output, the set of UI elements rendered at the user device to be updated.

12. The method of claim 1, wherein causing the set of UI elements to be rendered at the user device comprises:

causing a graphical user interface (GUI) to be rendered on a display of the user device, the GUI comprising the set of UI elements, wherein the set of UI elements are rendered on the display of the user device as a set of selectable cards.

13. The method of claim 12, wherein the GUI comprises a GUI element to receive additional NL based input, and wherein the GUI element is separate from the set of UI elements.

14. The method of claim 12, wherein the GUI comprises a user selectable GUI element for requesting a final response.

15. The method of claim 12, further comprising:

in response to user selection of a particular UI element of the set of UI elements, causing the GUI to be updated to comprise one or more user selectable GUI elements associated with the particular UI element.

16. The method of claim 1, further comprising:

selecting a given sub-prompt, of the corresponding sub-prompts, associated with a given UI element, included in the set of UI elements;

generating, based on processing at least a portion of the first LLM output associated with the given sub-prompt and using the LLM, further first LLM output usable to generate an additional set of UI elements, wherein each UI element, of the additional set of UI elements, is associated with a corresponding further sub-prompt of the given sub-prompt.

17. A system comprising:

one or more processors; and a memory, the memory storing computer readable instructions that, when executed by the one or more processors, cause the system to:

receive an input prompt for a large language model (LLM);

generate, based on processing the input prompt using a LLM, first LLM output that is usable to generate a set of user interface (UI) elements, wherein each UI element, of the set of UI elements, is associated with a corresponding sub-prompt of the input prompt;

cause, based on the first LLM output, the set of UI elements to be rendered at a user device;

receive further user input based on user interactions with one or more of the UI elements of the set of UI elements; and in response to determining that a response has been determined for at least a threshold number of the corresponding sub-prompts associated with the set of UI elements:

generate a final response to the input prompt based on generating second LLM output that is usable to generate the final response, the second LLM output generated based on processing the further user input using the LLM; and cause the final response to be rendered at the user device.

18. The system of claim 17, wherein the computer readable instructions to generate the first LLM output based on processing the input prompt and using the LLM comprise computer readable instructions to:

generate a first LLM input based on the input prompt, wherein the first LLM input comprises a request to decompose the input prompt into the corresponding sub-prompts; and process, using the LLM, the first LLM input to generate the first LLM output.

19. The system of claim 17, wherein the computer readable instructions to receive further user input based on user interactions with one or more of the UI elements, of the set of UI elements, comprise computer readable instructions to:

in response to detecting user selection of a particular UI element, of the set of UI elements, cause rendering of one or more interactive elements associated with the particular UI element; and detect a corresponding user interaction with at least one of the one or more interactive elements associated with the particular UI element, wherein the further user input comprises at least information indicative of the corresponding user interaction with the particular UI element.

20. A non-transitory computer readable medium containing computer-readable instructions that, when executed by computing apparatus, cause the computing apparatus to perform operations, the operations comprising:

receiving an input prompt for a large language model (LLM);

generating, based on processing the input prompt using a LLM, first LLM output that is usable to generate a set of user interface (UI) elements, wherein each UI element, of the set of UI elements, is associated with a corresponding sub-prompt of the input prompt;

causing, based on the first LLM output, the set of UI elements to be rendered at a user device;

receiving further user input based on user interactions with one or more of the UI elements of the set of UI elements; and in response to determining that a response has been determined for at least a threshold number of the corresponding sub-prompts associated with the set of UI elements:

generating a final response to the input prompt based on generating second LLM output that is usable to generate the final response, the second LLM output generated based on processing the further user input using the LLM; and causing the final response to be rendered at the user device.

* * * * *